United States Patent
Niehoff et al.

(10) Patent No.: US 11,542,898 B2
(45) Date of Patent: Jan. 3, 2023

(54) FUEL VAPOR FILTER PURGING OF A SUPERCHARGED INTERNAL COMBUSTION ENGINE IN INDUCTION MODE

(71) Applicant: Volkswagen Aktiengesellschaft, Wolfsburg (DE)

(72) Inventors: Alexander Niehoff, Wolfsburg (DE); Michael Mazur, Hannover (DE); Stefan Behrendt, Braunschweig (DE); Wolfram Gottschalk, Magdeburg (DE); Roman Grabowski, Leiferde (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/365,725

(22) Filed: Jul. 1, 2021

(65) Prior Publication Data
US 2022/0003191 A1    Jan. 6, 2022

(30) Foreign Application Priority Data
Jul. 1, 2020   (DE) ...................... 10 2020 208 229.4

(51) Int. Cl.
*F02M 25/08*   (2006.01)
*F02B 33/40*   (2006.01)

(52) U.S. Cl.
CPC ......... *F02M 25/0836* (2013.01); *F02B 33/40* (2013.01); *F02M 25/089* (2013.01)

(58) Field of Classification Search
CPC ............ F02D 41/003–0045; F02M 25/08–089
USPC ................. 123/518–521; 73/114.39
See application file for complete search history.

(56) References Cited

U.S. PATENT DOCUMENTS

| | | | |
|---|---|---|---|
| 5,216,995 A * | 6/1993 | Hosoda | F02D 41/0045 123/518 |
| 6,595,190 B1 * | 7/2003 | Sealy | F02D 41/0032 123/518 |
| 9,797,322 B2 | 10/2017 | Pursifull et al. | |
| 10,221,784 B2 | 3/2019 | Pursifull et al. | |

(Continued)

FOREIGN PATENT DOCUMENTS

| | | |
|---|---|---|
| DE | 102007040913 A1 | 3/2009 |
| DE | 102011018863 A1 | 7/2012 |

(Continued)

*Primary Examiner* — Jacob M Amick
*Assistant Examiner* — Charles J Brauch
(74) *Attorney, Agent, or Firm* — Muncy, Geissler, Olds & Lowe, P.C.

(57) ABSTRACT

A method is provided for operating an internal combustion engine, which comprises at least one combustion unit, a fresh gas tract for supplying fresh gas to the combustion unit, and a fuel tank system. A fresh gas compressor as well as a differential pressure valve are integrated into the fresh gas tract. The first purge gas line opens into a first section of the fresh gas tract, which is situated downstream from the differential pressure valve as well as upstream from the fresh gas compressor, while the second purge gas line opens into a second section of the fresh gas tract situated downstream from the fresh gas compressor. The differential pressure valve is at least partially closed at least temporarily during an intake mode of the internal combustion engine with fuel vapor filter purging, and purge gas is introduced into the fresh gas tract via the first purge gas line.

10 Claims, 1 Drawing Sheet

(56) References Cited

U.S. PATENT DOCUMENTS

| | | | |
|---|---|---|---|
| 10,533,524 B2 | 1/2020 | Choi et al. | |
| 10,934,953 B2 | 3/2021 | Pichler | |
| 2007/0239330 A1* | 10/2007 | Baumann | F02M 25/0818 |
| | | | 701/123 |
| 2009/0031705 A1* | 2/2009 | Yoshida | F01N 13/009 |
| | | | 60/278 |
| 2015/0101327 A1* | 4/2015 | Clark | F02D 41/144 |
| | | | 60/599 |
| 2015/0292421 A1* | 10/2015 | Pursifull | F02M 25/089 |
| | | | 123/518 |
| 2016/0222929 A1* | 8/2016 | Luehrsen | B60T 17/02 |
| 2017/0009673 A1* | 1/2017 | Dudar | F02M 25/0836 |
| 2018/0080416 A1* | 3/2018 | Choi | F02M 25/0836 |
| 2018/0355826 A1 | 12/2018 | Wyatt | |
| 2019/0040823 A1* | 2/2019 | Pursifull | F02M 25/0836 |
| 2020/0003162 A1 | 1/2020 | Asanuma | |

FOREIGN PATENT DOCUMENTS

| | | |
|---|---|---|
| DE | 102015206507 A1 | 10/2015 |
| DE | 202015003497 U1 | 8/2016 |
| DE | 102009008831 B4 | 9/2016 |
| DE | 102016205840 A1 | 10/2017 |
| DE | 102016224973 A1 | 3/2018 |
| DE | 102017216728 B3 | 12/2018 |
| DE | 102017006500 A1 | 1/2019 |
| DE | 102018111560 A1 | 11/2019 |

* cited by examiner

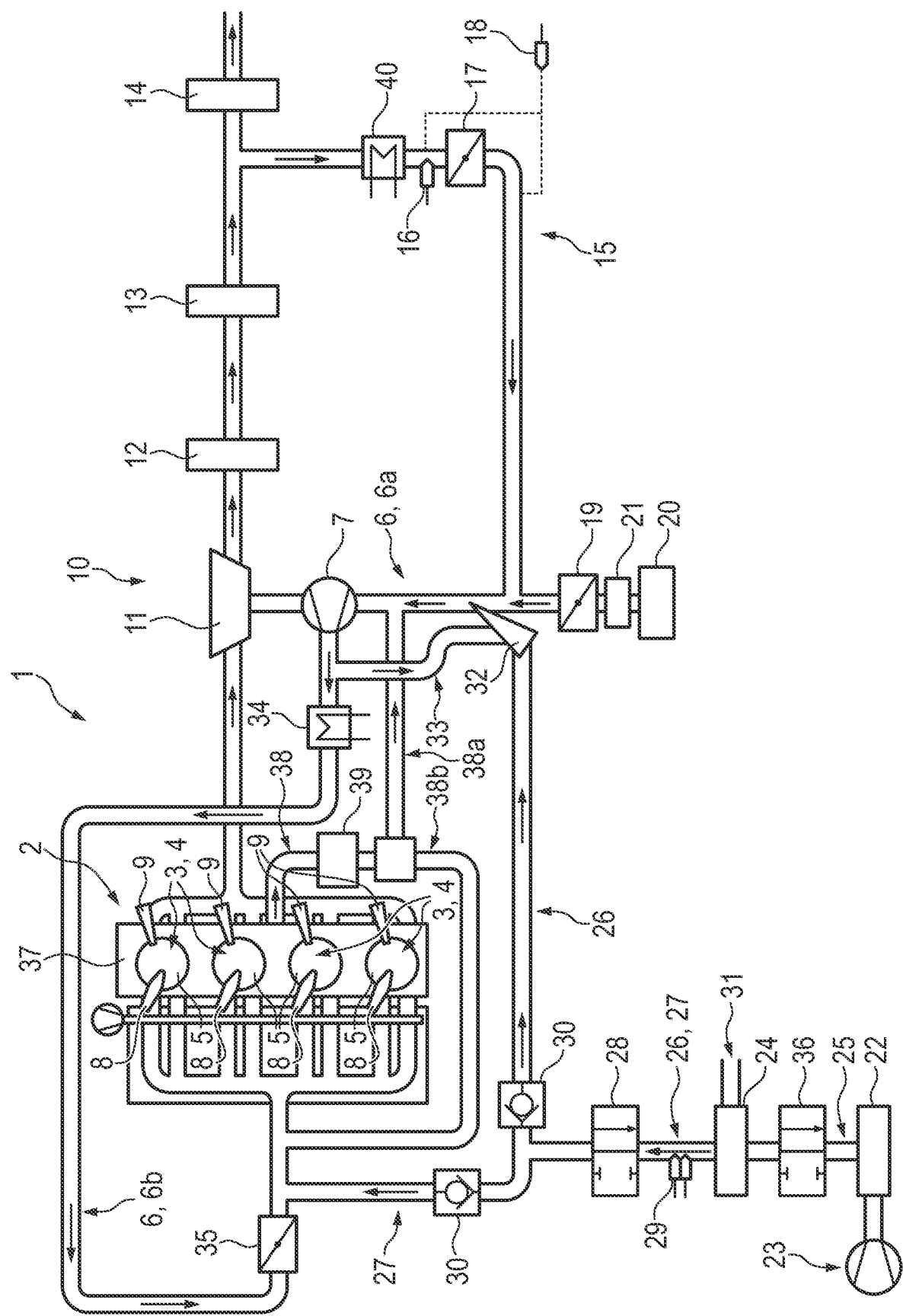

FUEL VAPOR FILTER PURGING OF A SUPERCHARGED INTERNAL COMBUSTION ENGINE IN INDUCTION MODE

This nonprovisional application claims priority under 35 U.S.C. § 119(a) to German Patent Application No. 10 2020 208 229.4, which was filed in Germany on Jul. 1, 2020 and which is herein incorporated by reference.

BACKGROUND OF THE INVENTION

Field of the Invention

The present invention relates to a method for operating an internal combustion engine, including a fuel tank system, which may be vented. The internal combustion engine may be, in particular, part of a motor vehicle.

Description of the Background Art

A fuel tank system for an internal combustion engine of a motor vehicle may include a tank venting line, which makes it possible to release a rising pressure in the fuel tank of the fuel tank system as a result of, for example, fuel evaporating into the surroundings at relatively high ambient temperatures. Also, no fuel vapors should preferably reach the surroundings, due to emission regulations. This is prevented in that a fuel vapor filter is integrated into the fuel venting line, which absorbs the fuel vapors. A fuel vapor filter of this type is often designed in the form of an active carbon filter.

To regenerate a fuel vapor filter of this type, a corresponding fuel tank system is usually additionally provided with a purge gas line, which is connected to the fuel vapor filter, on the one hand, and to the fresh gas tract of the internal combustion engine, on the other hand. During the operation of the internal combustion engine, ambient air may be temporarily sucked in via a connection of the fuel vapor filter to the surroundings by means of underpressure, which prevails in the area of the opening of the purge gas line to the fresh gas tract, compared to the ambient pressure. This ambient air flows through the fuel vapor filter in the opposite direction from the flow direction, in which the fuel vapors flow out of the fuel tank into the fuel vapor filter, thereby purging it. The fuel vapors from the fuel vapor filter are thus supplied to the combustion chambers of the combustion unit of the internal combustion engine via the fresh gas tract.

DE 10 2017 216 728 B3, which corresponds to US 2020/0277904, discloses an internal combustion engine, supercharged with the aid of an exhaust gas turbocharger, including a fuel tank system, the corresponding purge gas line being divided into two branches downstream from the tank venting valve, a first of which opens into the fresh gas tract downstream from the fresh gas compressor of the exhaust gas turbocharger, while the second branch opens into a Venturi nozzle, which is integrated into a bypass of the fresh gas compressor. A check valve, which opens upon an overpressure on the side of the tank venting valve, is furthermore integrated into each of the two branches.

DE 10 2016 224 973 A1, which corresponds to U.S. Pat. No. 10,533,524, also discloses an internal combustion engine, supercharged with the aid of an exhaust gas turbocharger, including a fuel tank system, the corresponding purge gas line being divided into two branches downstream from a tank venting valve, of which a first branch opens into the fresh gas tract downstream from the fresh gas compressor, and a second branch opens into the fresh gas tract upstream from the fresh gas compressor. The opening of the second branch is arranged downstream from a differential pressure valve, with the aid of which a relatively low pressure of the fresh gas is adjustable downstream from the differential pressure valve. The internal combustion engine furthermore comprises an exhaust gas return line, which branches out of the exhaust tract of the internal combustion engine downstream from an exhaust gas turbine, and which opens into the section of the fresh gas tract which is situated between the differential pressure valve and the opening of the second branch of the purge gas line. If a purging of the fuel vapor filter of the fuel tank system is to be carried out during an intake mode of the internal combustion engine, an introduction of the purge gas guided via the purge gas line takes place via the first branch and thus into a section of the fresh gas tract situated downstream from the fresh gas compressor, because a sufficient pressure gradient is then present via this first branch. During a compression mode of the internal combustion engine, on the other hand, an introduction of the purge gas takes place via the second branch, a sufficient pressure gradient then setting in via the second branch, due to a sufficiently extensive closing of the differential pressure valve.

SUMMARY OF THE INVENTION

It is therefore an object of the present invention to provide an advantageous purging of a fuel vapor filter of a fuel tank system of a supercharged internal combustion engine.

According to an exemplary embodiment of the invention, a method is provided for operating an internal combustion engine, which comprises at least one combustion unit (in particular a gasoline engine or another at least temporarily spark-ignited combustion unit), a fresh gas tract for supplying fresh gas to the combustion unit, and a fuel tank system. At least one fresh gas compressor is integrated into the fresh gas tract, which may be, in particular, part of an exhaust turbocharger, as well as a differential pressure valve, in particular as a butterfly valve in one embodiment. The flue tank system includes at least one fuel tank, a fuel vapor filter, which is fluid-conductively connected to the surroundings, a tank venting line leading from the fuel tank to the fuel vapor filter, a first purge gas line leading from the fuel vapor filter to the fresh gas tract of the internal combustion engine, and a second purge gas line leading from the fuel vapor filter to the fresh gas tract. The first purge gas line opens into a first section of the fresh gas tract, which is situated downstream from the differential pressure valve as well as upstream from the fresh gas compressor, while the second purge gas line opens into a second section of the fresh gas tract situated downstream from the fresh gas compressor, preferably into a (second) section, which is also arranged downstream from a throttle device integrated into the fresh gas tract, for example in the form of a butterfly valve (throttle valve). The first purge gas line and the second purge gas line may be provided with an integral design, preferably in sections, in particular in a first section leading away from the fuel vapor filter. A tank venting valve may also be provided for adjusting the mass flow of purge gas introduced into the fresh gas tract from at least one of the purge gas lines. A tank venting valve of this type may be arranged, in particular, in the preferably provided integral section of the two purge gas lines. According to the invention, it is provided that the differential pressure valve is at least partially closed, and purge gas is thereby introduced into the fresh gas tract via the first purge gas line, at least temporarily during an intake mode of the internal combustion engine with fuel vapor filter purging (i.e. while simultaneously purging the fuel vapor filter and thus while guiding purge gas via at least one of the purge gas lines). It may be provided, in particular, that the closing position of the differential pressure valve is varied or adapted for the targeted adjustment of a defined purge gas mass flow to be conducted via the first purge gas line.

The "intake mode" of an internal combustion engine with fresh gas compression, on which this invention is based, is understood to be the operating mode, in which the intensity of the organ regulating the fresh gas compression is in an inactive starting position or minimum position, i.e. not in active normal operation. It may be provided, in particular, that a (mean) pressure of the fresh gas, which is less than or equal to the ambient pressure, is present in the section of the fresh gas tract situated between the fresh gas compressor and the combustion unit.

The differential pressure value integrated into the fresh gas tract upstream from the opening of the first purge gas line is therefore (also) to be used according to the invention to implement a pressure gradient over the first purge gas line during an intake mode, so that purge gas may be conducted as needed via the first purge gas line.

It may preferably be provided that purge gas is introduced into the fresh gas tract via the second purge gas line at least temporarily during the intake mode with fuel vapor filter purging, which is advantageously possible in intake mode of the internal combustion engine and the resulting pressure gradient over the second purge gas line as a result of the suction action of the combustion unit and, in particular, also the throttle device in the section situated directly upstream therefrom, into which the second purge gas line preferably opens. It may be particularly preferably provided that a guidance of purge gas via the second purge gas line takes place simultaneously with a guidance of purge gas via the first purge gas line, whereby a relatively great (total) purge gas mass flow may be implemented during the intake mode. The additional guidance of purge gas via the first purge gas line in this case may be particularly advantageous because a purge gas mass flow, which is guided exclusively via the (second) purge gas line opening into the fresh gas tract upstream from the fresh gas compressor, may be relatively greatly limited, due to the intake mode. These limitations may result from the pressure ratio (ratio of the pressure of the fresh gas in the area of the opening of the purge gas line to the ambient pressure) over the (second) purge gas line, which no longer permits an increase of the purge gas guided via the (second) purge gas line upon reaching the critical value between 0.52 and 0.53, this critical pressure ratio being present relatively early at relatively high ambient temperatures and relatively low ambient pressures (in particular due to an operation of the internal combustion engine at a relatively great geographical elevation) and thus permits only a relatively low purge gas mass flow via the (second) purge gas line. A further advantage, which may result from a guidance of the purge gas via the first purge gas line, is in a better mixing of the purge gas with the air as a result of the relatively extensive guidance of the fresh gas (which then comprises at least the air and the purge gas) in the fresh gas tract until it reaches the combustion unit.

Since a pressure loss in the fresh gas conducted via the fresh gas tract goes hand in hand with an at least partial closing of the differential pressure valve, which may be carried out during the intake mode of the internal combustion engine with fuel vapor filter purging to introduce purge gas into the fresh gas tract via the first purge gas line, which may have a negative effect on the operating behavior of the internal combustion engine, it may be preferably provided to conduct purge gas via the first purge gas line in a targeted manner only if it may not be conducted via the second purge gas line in a sufficiently high mass flow. Accordingly, it may be provided within the scope of a method according to the invention that the differential pressure value is closed during the intake mode with fuel vapor filter purging with the goal of implementing a guidance of purge gas via the first purge gas line only if a setpoint total purge gas mass flow to be introduced into the fresh gas tract is above a limit value, this limit value defining a maximum purge gas mass flow which may be guided via the second purge gas line in the present operating state of the internal combustion engine. The present operating stage is influenced by inner operating parameters, in particular the load and the rotational speed at which the combustion unit is operated, as well as by external operating parameters, in particular the temperature and the pressure of the ambient air.

Against this background, it may be provided within the scope of a method according to the invention that the differential pressure value is temporarily opened as wide as possible during the intake mode with fuel vapor filter purging, if the setpoint total purge gas mass flow is below the limit value. A lowest possible throttling of the fresh gas flow by the differential pressure valve may be implemented thereby, if a throttling of this type is not desired and also not necessary. This may therefore be the case, in particular, if the differential pressure value is provided exclusively to implement a pressure gradient as needed via the first purge gas line for the purpose of permitting a guidance of purge gas via the first purge gas line. However, an at least partial closing of the differential valve pressure and the resulting generation of a locally relatively low pressure of the fresh gas may possibly be sensible for other purposes. In this case, such a closing of the differential pressure valve may preferably not take place to an extent that is above that necessary for other purposes (for a targeted guidance of purge gas via the first purge gas line).

Another purpose of this type, for which an at least partial closing of the differential pressure value may be used, may be, in particular, the implementation of an exhaust gas recirculation. A corresponding internal combustion engine usable within the scope of a method according to the invention may, for this purpose, comprise an exhaust gas return line, which leads from an exhaust tract of the internal combustion engine, which is used to remove exhaust gas from the combustion unit and to introduce at least a portion of this exhaust gas into the surroundings, to the first section of the fresh gas tract, which is situated downstream from the differential pressure valve as well as upstream from the fresh gas compressor. The exhaust gas return line may lead away from the exhaust tract, in particular downstream from an exhaust gas turbine, to implement a so-called low-pressure exhaust gas recirculation. An exhaust gas return valve, which is provided and configured to adjust an exhaust gas mass flow guided via the exhaust gas return line, may preferably be integrated into this exhaust gas return line. A method according to the invention for operating an internal combustion engine of this type may provide that exhaust gas is guided via the exhaust gas return line at least temporarily during the intake mode with fuel vapor filter purging (for implementing an exhaust gas recirculation), the exhaust gas mass flow guided via the exhaust gas return line being adjusted, in particular in a regulated manner, with the aid of the exhaust gas return valve. It may be particularly preferably provided that an influence of the closing position of the differential pressure value is set, which is to be initiated as a function of a purge gas mass flow to be introduced into the fresh gas tract via the first purge gas line and which this closing position has on the exhaust gas mass flow, is compensated for with the aid of the exhaust gas return valve. The closing position of the differential pressure valve should therefore be selected exclusively as a function of the purge gas mass flow to be guided via the first purge gas line and the pressure gradient over the purge gas line needed for this purpose, while the unavoidable (yet also desired) influence that the at least partially closed differential pressure valve, or the relatively low local pressure generated thereby, has on the exhaust gas mass flow conducted via the exhaust gas return line, is taken into account by a corresponding driving of the exhaust gas return valve when adjusting the exhaust gas mass flow.

The internal combustion engine used within the scope of a method according to the invention may be, in particular, part of a motor vehicle. The combustion unit of the internal combustion engine may be provided, in particular, for the direct or indirect provision of the driving power for the motor vehicle. The motor vehicle may be, in particular, a wheel-based and non-railbound motor vehicle (preferably a passenger car or truck or a comparable mobile agricultural machine).

The designation "fuel vapor filter" does not mean, according to the invention, that the latter must filter or absorb the volatile fuel in gaseous form. Instead, the fuel may have already been (partially) condensed out during the filtering.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE shows a simplified representation of an internal combustion engine according to the invention.

DETAILED DESCRIPTION

The FIGURE shows a simplified representation of an internal combustion engine 1, which may be used within the scope of a method according to the invention. It includes a combustion unit 2, in which a plurality of combustion chambers 3 are formed. During the operation of internal combustion engine 1, mixture quantities are combusted in the known manner in a defined sequence in combustion chambers 3, which are partially limited by cylinders 4 of combustion unit 2 as well as pistons 5 movably guided therein, the pressure increases thus generated in combustion chambers 3 being used to move pistons 5. These movements of pistons 5 are converted into a rotational movement of a crankshaft with connecting rods connected therebetween, the guidance of pistons 5 via the connecting rods with the aid of the crankshaft simultaneously resulting in a cyclical back-and-forth movement of pistons 5.

The mixture quantities provided for combustion in combustion chambers 3 comprise, on the one hand, fresh gas, which is made up entirely or primarily of ambient air sucked in from the surroundings and which is supplied to combustion unit 2 via a fresh gas tract 6. The fresh gas is guided via a fresh gas compressor 7 of an exhaust gas turbocharger, which is integrated into fresh gas tract 6, with the aid of which a compression of the fresh gas may be effectuated in a compression mode of internal combustion engine 1. The mixture quantities furthermore comprise fuel, which is introduced directly into combustion chambers 3 with the aid of fuel injectors 8 and ignited with the aid of ignition devices 9 and may thus be combusted. The exhaust gas produced during the combustion of the fresh gas/fuel mixture quantities in combustion chambers 3 is removed via an exhaust tract 10 and flows through an exhaust gas turbine 11 of exhaust gas turbocharger and subsequently multiple exhaust gas aftertreatment devices, for example initially a first three-way catalytic converter 12, then a particle filter 13 and finally a second three-way catalytic converter 14.

A portion of the exhaust gas guided via exhaust tract 10 may be introduced into fresh gas tract 6 via an exhaust gas return line 15 at least temporarily during an operation of combustion unit 2. This exhaust gas return line 15, into which an exhaust gas cooler 40, a temperature sensor 16, an exhaust gas return valve 17 as well as a differential pressure sensor 18 are integrated, branches from exhaust tract 10 downstream from exhaust gas turbine 11 and specifically from a section arranged between particle filter 13 and second three-way catalytic converter 14, and opens into fresh gas tract 6 upstream from fresh gas compressor 7, specifically into a section of fresh gas tract 6 arranged upstream from fresh gas compressor 7 and downstream from a differential pressure valve 19.

An air filter 20 and an air mass sensor 21 situated downstream from air filter 20 are also integrated into fresh gas tract 6 upstream from differential pressure valve 19.

The fuel to be introduced into combustion chambers 3 with the aid of fuel injectors 8 originates in a fuel tank 22 of a fuel tank system of internal combustion engine 1. This fuel tank system comprises not only fuel tank 2, to which a tank leakage diagnosis module 23 is connected, but also a fuel vapor filter 24, which is designed, in particular, in the form of an active carbon filter or may comprise such a filter, and which is connected to fuel tank 22 via a tank venting line 25. Fuel vapor filter 24 is furthermore connected to fresh gas tract 6 of internal combustion engine 1 via two purge gas lines 26, 27, these two purge gas lines 26, 27 being integrally formed in a first section leading away from fuel vapor filter 24. An actively drivable tank venting valve 28 as well as a combined pressure and temperature sensor 29 between fuel vapor filter 24 and tank venting valve 28 are integrated into this integral section of the two purge gas lines 26, 27, while a check valve 30, which closes automatically in the case of an underpressure on the side of tank venting valve 28, is integrated into each of the separate sections of the two purge gas lines 26, 27. A first of the two purge gas lines 26, 27, purge gas line 26, opens into fresh gas tract 6 upstream from fresh gas compressor 7 and specifically into (first) section 6a of fresh gas tract 6, which is situated between differential pressure valve 19 and fresh gas compressor 7, however at a point upstream from the opening of exhaust gas return line 15.

The opening of first purge gas line 26 into fresh gas tract 6 takes place (indirectly) via a Venturi nozzle 32, an outlet of Venturi nozzle 32 opening into fresh gas tract 6, while a main inlet of Venturi nozzle 32 is connected to a drive line 33, which leads away from fresh gas tract 6 downstream from fresh gas compressor 7. First purge gas line 26 opens into a secondary inlet of Venturi nozzle 32, which is arranged in the area of a reduction of the cross-sectional area of Venturi nozzle 32. Purge gas may be sucked in via first purge gas line 26 and the secondary inlet of Venturi nozzle 32 with the aid of a fresh gas flow, which, originating in drive line 33, flows through Venturi nozzle 32.

Second purge gas line 27 opens into a second section 6b of fresh gas tract 6 downstream from fresh gas compressor 7 and also downstream from a charge air cooler 34 as well as a throttle valve 35.

Fuel vapor filter 24 is gas-conductively connected to the surroundings by its side facing away from tank venting line 25 (with respect to its filtering effect for fuel vapors) via an ambient air line 31.

Fuel tank 22 is filled with fuel, a portion of this fuel, which is actually liquid, generally being evaporated, so that fuel in the gaseous aggregate state is also present in fuel tank 22. Such an evaporation of fuel in fuel tank 22 occurs, in particular, at relatively high ambient temperatures as well as at a relatively low ambient pressure, for example as a result of an uphill travel of a motor vehicle comprising internal combustion engine 1, because the evaporation temperatures of the different fuel constituents corresponding to the associated vapor pressure curves are reduced by a lowering of the ambient pressure. To avoid an impermissibly high overpressure in fuel tank 22, due to an evaporation of this type, the possibility of a pressure compensation using the ambient pressure via tank venting line 25, fuel vapor filter 24 and ambient air line 31 is given, the fact that a pressure compensation of this type results in an escape of fuel vapors into the surroundings being prevented by fuel vapor filter 24.

Venting fuel tank 22 results in an increasing saturation of fuel vapor filter 24, which, in turn, makes it necessary to temporarily regenerate it. A purging of fuel vapor filter 24 is provided for this purpose, in that ambient air is sucked in via ambient air line 31. This ambient air flows through fuel vapor filter 24, whereby fuel molecules absorbed in fuel vapor filter 24 are carried along by the ambient air and are introduced into fresh gas tract 6 via at least one of purge gas lines 26, 27. The mass flow of the purge gas may be adjusted in a targeted manner with the aid of tank venting valve 28. By introducing the purge gas and the fuel molecules contained therein, the latter are supplied to combustion chambers 3 of combustion unit 2 for thermal utilization or combustion.

To suck in only ambient air via ambient air line 31 and not additionally also fuel vapors via tank venting line 25 during a purging of fuel vapor filter 24, tank venting line 25 may be blocked with the aid of a tank shutoff valve 36.

A purging of fuel vapor filter 24 is only temporary yet always provided during the operation of combustion unit 2, because only then may the fuel introduced into fresh gas tract 6 by the purging of fuel vapor filter 24 also be safely supplied to combustion chambers 3 for combustion. In addition, a sufficient pressure gradient over at least one of purge gas lines 26, 27 may then be ensured.

According to the invention, it is provided that purge gas is introduced into fresh gas tract 6 via first purge gas line 26 as well as via second purge gas line 27 if fuel vapor filter 24 is purged during an intake mode of internal combustion engine 1. A sufficient pressure gradient over second purge gas line 27 is present, in principle, due to the suction action of combustion unit 2 during such an intake mode. A sufficient purge gradient also via first urge gas line 26, however is ensured in that differential pressure valve 19 is at least partially closed, whereby a pressure drop over differential pressure valve 19 is generated, i.e. an underpressure on the upstream side of differential pressure valve 19 compared to the ambient pressure. Venturi nozzle 32 does not support the formation of a sufficient pressure gradient over first purge gas line 26 or only to a limited extent, because a significant overpressure on the downstream side of fresh gas compressor 7, compared to the upstream side of fresh gas compressor 7, is necessary for the suction action thereof, for the purpose of guiding fresh gas via drive line 33. However, a pressure increase of this type is not present in an intake mode of the internal combustion engine.

When purging fuel vapor filter 24 during a compressor mode of the internal combustion engine, the purge gas is, however, guided exclusively via first purge gas line 26, since the check valve integrated into second purge gas line 27 is closed due to the overpressure (compared to the ambient pressure) generated with the aid of fresh gas compressor 7, which is present in fresh gas tract 6 in the area of the opening of second purge gas line 27. A sufficient pressure gradient over first purge gas line 26 is implemented during a compression mode of this type with fuel vapor filter purging, on the one hand, due to the location of the opening of first purge gas line 26 or the outlet of Venturi nozzle 32 on the low-pressure side of fresh gas compressor 7 as well as by the action of Venturi nozzle 32 in a supporting manner. An at least partial closing of differential pressure valve 19 with the goal of guiding purge gas via first purge gas line 26 is not necessary during a compression mode of this type with fuel vapor filter purging. However, an at least partial closing of differential pressure nozzle 19 may be provided even in this case, which is then used for the purpose of implementing a sufficient pressure gradient over exhaust gas return line 15 to introduce exhaust gas into fresh gas tract 6 in a sufficient quantity via exhaust gas return line 15. A control and, in particular regulation, of the exhaust gas mass flow guided via exhaust gas return line 15 may then be achieved exclusively by a corresponding adjustment of differential pressure valve 19 or by a combined position of differential pressure valve 19 and exhaust gas return valve 17 or by a superimposed position thereof with respect to their effects.

In contrast, if an exhaust gas recirculation is provided even during an intake mode of the internal combustion engine with fuel vapor filter purging, an adaptation of the exhaust gas mass flow guided via exhaust gas return line 15 takes place within the scope of a control and, in particular, a regulation of this exhaust gas mass flow exclusively with the aid of exhaust gas return valve 17, the influence of a closing position of differential pressure valve 19, which was set with the goal of generating a sufficient pressure gradient over first urge gas line 26, being compensated for thereby.

It is additionally shown in the FIGURE that internal combustion engine 1 also comprises a device for venting a cylinder crankcase 37 of combustion unit 2, as is known in principle. A crankcase venting line 38 is provided for this purpose, which leads away from a space accommodating the crankshaft, which is limited by cylinder crankcase 37 of combustion unit 2, and which is integrated into the one separating device 39, which is used to separate liquid and solid foreign bodies from venting gas guided via crankcase venting line 38. Downstream from separating device 39, crankcase venting line 38 is divided into a first branch 38a, which opens into fresh gas tract 6 upstream from fresh gas compressor 7, while a corresponding opening of second branch 38b is arranged downstream from fresh gas compressor 7 and specifically also downstream from the opening of second purge gas line 27. Depending on the generated compression power of fresh gas compressor 7 or on whether the internal combustion engine is operating in an intake or compression mode, venting gas may be introduced into fresh gas tract 6 via either first branch 38a or second branch 38b of crankcase venting line 38.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an internal combustion engine, the method comprising:
    providing a combustion unit;
    providing a fresh gas tract for supplying fresh gas to the combustion unit, a fresh gas compressor and a differential pressure valve being integrated into the fresh gas tract, the fresh gas tract having a first section and a second section;
    providing a crankcase venting line for venting a cylinder crankcase of the combustion unit, wherein a branch of the crankcase venting line leads into the second section of the fresh gas tract at a point downstream of the fresh gas compressor;
    providing a fuel tank system that comprises a fuel tank, a fuel vapor filter that is fluid-conductively connected to the surroundings, a tank venting line leading from the fuel tank to the fuel vapor filter, a first purge gas line, which leads from the fuel vapor filter into the first section of the fresh gas tract at a point that is downstream from the differential pressure valve as well as upstream from the fresh gas compressor, and a second purge gas line, which leads, in a flow direction, from the fuel vapor filter into the second section of the fresh gas tract at a point that is downstream from the fresh gas compressor and upstream of the point at which the branch of the crankcase venting line leads into the second section of the fresh gas tract;
    partially closing the differential pressure valve at least temporarily during an intake mode of the internal combustion engine with fuel vapor filter purging; and
    introducing purge gas into the first section of the fresh gas tract via the first purge gas line.

2. The method according to claim 1, wherein a closing position of the differential pressure valve is varied to adjust a purge gas mass flow to be guided via the first purge gas line.

3. The method according to claim 1, wherein the purge gas is introduced into the fresh gas tract via the second purge gas line at least temporarily during the intake mode with fuel vapor filter purging.

4. The method according to claim 3, wherein the purge gas is introduced into the fresh gas tract via the first purge gas line and the second purge gas line at least temporarily during the intake mode with fuel vapor filter purging.

5. The method according to claim 1, wherein the differential pressure valve is at least partially closed during the intake mode with fuel vapor filter purging for guiding purge gas via the first purge gas line only if a setpoint total purge gas mass flow to be introduced into the fresh gas tract is above a limit value, which defines a maximum purge gas mass flow which may be guided via the second purge gas line in the operating state of the internal combustion engine.

6. The method according to claim 5, wherein the differential pressure valve is opened as wide as possible during the intake mode with fuel vapor filter purging if the setpoint total purge gas mass flow is below the limit value.

7. The method according to claim 1, wherein exhaust gas is guided via an exhaust gas return line, which leads from an exhaust tract of the internal combustion engine into the first section of the fresh gas tract, at a point that is downstream from the differential pressure valve as well as upstream from the fresh gas compressor, at least temporarily during the intake mode with fuel vapor filter purging, and wherein an adjustment of an exhaust gas mass flow guided via the exhaust gas return line is carried out with the aid of an exhaust gas return valve integrated into the exhaust gas return line.

8. The method according to claim 7, wherein an influence of a closing position of the differential pressure valve on the exhaust gas mass flow is compensated for with the aid of the exhaust gas return valve.

9. The method according to claim 1, wherein the crankcase venting line has another branch that leads into the first section of the fresh gas tract at a point that is upstream of the fresh gas compressor and downstream of the point at which the first purge gas line leads into the first section of the fresh gas tract.

10. The method according to claim 7, wherein the exhaust tract includes an exhaust gas turbine, a first catalytic converter downstream of the exhaust gas turbine, a particle filter downstream of the first catalytic converter and a second catalytic converter downstream of the particle filter, wherein the exhaust gas return line leads from the exhaust tract at a point downstream of the particle filter and upstream of the second catalytic converter.

* * * * *